United States Patent [19]

Nojima et al.

[11] Patent Number: 5,325,203
[45] Date of Patent: Jun. 28, 1994

[54] ADAPTIVELY CONTROLLED NOISE REDUCTION DEVICE FOR PRODUCING A CONTINUOUS OUTPUT

[75] Inventors: Satoshi Nojima, Kanagawa; Toshitaka Senuma, Tokyo, both of Japan

[73] Assignee: Sony Corporation, Shinagawa, Japan

[21] Appl. No.: 46,578

[22] Filed: Apr. 14, 1993

[30] Foreign Application Priority Data

Apr. 16, 1992 [JP] Japan .................................. 4-122757
Apr. 16, 1992 [JP] Japan .................................. 4-122758

[51] Int. Cl.⁵ ............................................. H04N 5/21
[52] U.S. Cl. ................................... 348/607; 348/624; 348/625
[58] Field of Search ................. 358/167, 160, 105, 36; H04N 5/213, 5/21

[56] References Cited

U.S. PATENT DOCUMENTS

| | | | |
|---|---|---|---|
| 4,549,213 | 10/1985 | Illetschko | 358/167 |
| 4,636,863 | 1/1987 | Kaizaki | 358/167 |
| 4,677,486 | 6/1987 | Noda et al. | 358/36 |
| 4,703,343 | 10/1987 | Honjo | 358/167 |
| 4,748,498 | 5/1988 | Yamanishi et al. | 358/36 |
| 4,750,037 | 6/1988 | Kido | 358/167 |
| 4,760,449 | 6/1988 | Matsumoto | 358/167 |
| 4,860,105 | 8/1989 | Sakaguchi et al. | 358/36 |
| 4,926,361 | 5/1990 | Ohtsubo | 358/167 |
| 5,099,322 | 3/1992 | Grove | 358/160 |

FOREIGN PATENT DOCUMENTS

| | | | |
|---|---|---|---|
| 0309015 | 12/1988 | Japan | 358/167 |
| 16078 | 1/1989 | Japan | H04N 5/21 |
| 51772 | 2/1989 | Japan | H04N 5/21 |

Primary Examiner—James J. Groody
Assistant Examiner—Chris Grant
Attorney, Agent, or Firm—Lewis H. Eslinger; Jay H. Maioli

[57] ABSTRACT

An adaptively controlled noise reduction device in which an input video signal is supplied to first, second, and third adders and in which an output of the first adder is supplied to the second adder via a memory responsive to a controller whereby the memory provides a controllable delay. An output of the second adder is supplied via a first coefficient multiplication unit having variable attenuation that is controlled by the controller to the first adder as well as via a second coefficient multiplication unit having variable attenuation that is controlled by the controller to the third adder. A change-over switch responsive to the controller outputs either a signal from the third adder or from the memory. Therefore, a signal is output even during the delay period produced by the memory when the signal is delayed between the first and second adders.

6 Claims, 6 Drawing Sheets

ADAPTIVELY CONTROLLED NOISE REDUCTION DEVICE FOR PRODUCING A CONTINUOUS OUTPUT

BACKGROUND OF THE INVENTION

1. Field of the Invention

This invention relates to a device for reducing the noise in picture signals and, more particularly, to a noise reduction device for reducing the noise in picture signals by taking advantage of field correlation or frame correlation.

2. Description of the Related Art

In video signal transmission or recording/reproducing apparatus, such as a TV receiver or a VTR, a noise reducing device for processing video signals with a noise reducing operation by taking advantage of the field correlation or frame correlation is utilized for obtaining high-quality video signals.

Such noise reducing device is provided with a memory having a storage capacity corresponding to a one-field or one-frame period. The difference between the input video signal and the video signal delayed by one field or by one frame from the input video signal is detected as noise. The detected output is multiplied by a noise-reducing coefficient and the resulting product is subtracted from the input video signal to produce a noise-reduced video signal.

With such noise reducing device, since the step of the noise-reducing effect is compulsorily changed over from outside, only a fixed noise reducing effect may be achieved for changes in the image or picture, so that a noise-reducing effect cannot be adapted to the actual state of the picture or the residual image.

On the other hand, if the noise reducing effect is enhanced, residual image tends to be left in the picture portions where changes in the motion are acute, so that a picture which is only hard to view can be produced. Conversely, if the residual image is inhibited, it becomes impossible to achieve the noise-reducing effect. Consequently, it is extremely difficult to set the characteristics of the noise reducing device so as to achieve the noise reducing effect in such a manner as to eliminate the residual image.

OBJECTS AND SUMMARY OF THE INVENTION

In view of the above-described status of the art, it is an object of the preset invention to provide a noise reducing device whereby the residual image may be minimized and the noise components contained in the input video signals may be reduced effectively.

It is another object of the present invention to provide a noise reducing device whereby the noise-reducing effect may be achieved adaptively with respect to changes in the state of the picture.

The noise reducing device according to the present invention includes first to third addition means supplied with input video signals, delay means for delaying the addition output signal of the first addition means by a predetermined amount $z^{-1}$ and supplying the delayed output signal to the second addition means, first coefficient multiplication means for multiplying the addition output signal of the second addition means with a first attenuation coefficient k, and supplying the resulting signal to the first addition means, and second coefficient multiplication means for multiplying the addition output signal of the second addition means with a second attenuation coefficient $k_2$ and supplying the resulting signal to the third addition means, and is adapted for processing the input video signal with noise reduction in accordance with a transfer function H(z)

$$H(z) = \{(1-k_2)-(k_1-k_2)z^{-1}\}/(1-k_1 z^{-1})$$

and outputting the resulting output image signal from the third addition means.

The delay means is a memory having a storage capacity corresponding to a one-frame period or a one-field period. The second addition means detects a one-field or one-frame difference of the input video signal, while the first and second coefficient multiplication means multiply the one-field or one-frame difference as detected by the second addition means with a first attenuation coefficient $k_1$ and a second attenuation coefficient $k_2$, where $k_1 > k_2$, respectively.

Additionally, motion detection means is provided for detecting the motion of a picture represented by the input video signal and the first attenuation coefficient $k_1$ of the first coefficient multiplication means and the second attenuation coefficient $k_2$ of the second coefficient multiplication means are controlled responsive to the motion of the picture detected by the motion detection means.

In addition, scene change detection means is provided for detecting the rate of change of the scene of the picture represented by the input video signal, and the first attenuation coefficient $k_1$ and second attenuation coefficient $k_2$ are controlled responsive to the rate of change of the scene of the picture as detected by the scene change detection means.

In the noise reducing device according to the present invention, the delay means delay the addition output signal of the first addition means supplied with input video signals by a predetermined amount $z^{-1}$ to transmit the delayed output signal to the second addition means. The second addition means transmits an addition output signal indicating the difference between the input video signal and the delayed output signal to the first and second coefficient multiplication means. The first coefficient multiplication means multiply the addition output signal of the second addition means by the first attenuation coefficient $k_1$ to transmit the resulting signal to the first addition means. The second coefficient multiplication means multiply the addition output signal of the second addition means by the second attenuation coefficient $k_2$ to transmit the resulting signal to the third addition means. The third addition means add the output signal of the second coefficient multiplication means to the input video signal to output a noise reduced output video signal in accordance with the transfer function $$H(z) = \{(1-k_2)-(k_1-k_2)z^{-1}\}/(1-k_1 z^{-1}).$$

In summary, with the noise reducing device according to the present invention, the delay means delays the addition output signal of the first addition means by an amount $z^{-1}$ corresponding to a one-frame or one-field period by the delay means, and the second addition means detects a one-field or one-frame difference of the input video signal. The first and second coefficient multiplication means multiply the one-field or one-frame difference, as detected by the second addition means, by the first attenuation coefficient $k_1$ and second attenuation coefficient $k_2$, where $k_1 > k_2$.

In addition, the motion detection means, detecting the motion of the picture represented by the input video signal, controls the first attenuation coefficient $k_1$ of the first coefficient multiplication means and the second attenuation coefficient $k_2$ of the second coefficient multiplication means responsive to the motion of the picture as detected by the motion detection means.

The scene change detection means controls the coefficients $k_1$, $k_2$ responsive to the detected rate of change of the picture.

Other objects and advantages of the present invention will become apparent from the following description of the preferred embodiments and the claims.

DETAILED DESCRIPTION OF THE PREFERRED EMBODIMENTS

Referring to the drawings, preferred embodiments of the noise reducing device according to the present invention are explained in detail.

Figure 1:
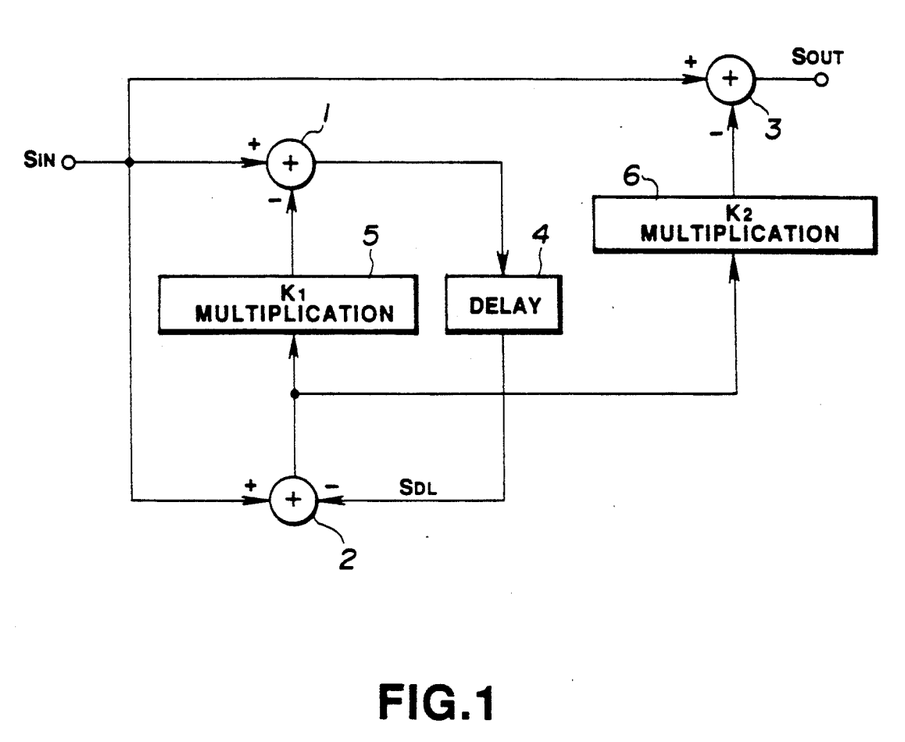
FIG. 1 is a block diagram showing a first fundamental arrangement of a noise reducing device according to the present invention.

The first fundamental arrangement of the noise reducing device according to the present invention is shown in FIG. 1, and includes first to third additive nodes 1 to 3, supplied with an input picture signal $S_{IN}$, a delay unit 4 for delaying a sum output signal from additive node 1 by a predetermined delay $z^{-1}$ and supplying a delayed output signal $S_{DL}$ to the second additive node 2, a first coefficient multiplication unit 5 for multiplying a sum output signal from the second additive node 2 by a first attenuation coefficient $k_1$ and supplying the resulting signal to the first additive node 1, and a second coefficient multiplication unit 6 for multiplying a sum output signal from the second additive node 2 by a second attenuation coefficient $k_2$ and supplying the resulting signal to the third additive node 3.

In the present noise reducing apparatus, the delay unit 4 accords the delay $z^{-1}$ corresponding to a field or a frame to a sum output signal from the first additive node 1. The second additive node 2 detects a difference between the input picture signal $S_{IN}$ and the delayed output signal $S_{DL}$ supplied from the delay unit 4. The first coefficient multiplication unit 5 multiplies a sum output signal from the second additive node 2, that is the detected noise component, with the first attenuation coefficient $k_1$ to transmit the resulting signal to first additive node 1. The first additive node 1 subtracts the noise component multiplied by the first attenuation coefficient $k_1$ by the first coefficient multiplication unit 5 from the input video signal $S_{IN}$ to transmit the noise-reduced input video signal $S_{IN}$ to delaying unit 4. That is, the second additive node 2 detects the noise component by taking advantage of the field or frame correlation. Specifically, the second additive node 2 detects the difference between the delayed output signal $S_{DL}$, which is equal to the input video signal $S_{IN}$ noise-reduced by the first additive node 1 and delayed by the delay amount $z^{-1}$ corresponding to one frame or one field by the delay unit 4, and the input video signal $S_{IN}$, as a noise component of the input video signal $S_{IN}$.

The second coefficient multiplication unit 6 multiplies a sum output signal of the second additive node 2, that is the detected noise component, by the second attenuation coefficient $k_2$, to transmit the resulting signal to the third additive node 3. The third additive node 3 subtracts the noise component, level-controlled by being multiplied with the second attenuation coefficient $k_2$ by the second coefficient multiplication unit 6, from the input video signal $S_{IN}$, to output an output video signal $S_{OUT}$, which is a signal obtained by processing the input video signal $S_{IN}$ in accordance with a transfer function H (z)

$$H(z) = \{(1-k_2)-(k_1-k_2)z^{-1}\}/(1-k_1 z^{-1}).$$

With the above-described noise reducing apparatus, the first attenuation coefficient $k_1$ to be multiplied by the noise component detected by the second additive node 2 may be varied for adaptively changing characteristics of a processing system designed for detecting the noise component contained in the input video signal $S_{IN}$. On the other hand, the second attenuation coefficient $k_2$ to be multiplied by the noise component detected by the second additive node 2 may be varied for adaptively changing characteristics of a processing system designed for reducing the noise component contained in the input video signal $S_{IN}$. In this manner, the residual image may be diminished to enable a noise component contained in the input video signals $S_{IN}$ to be reduced effectively.

Figure 10:
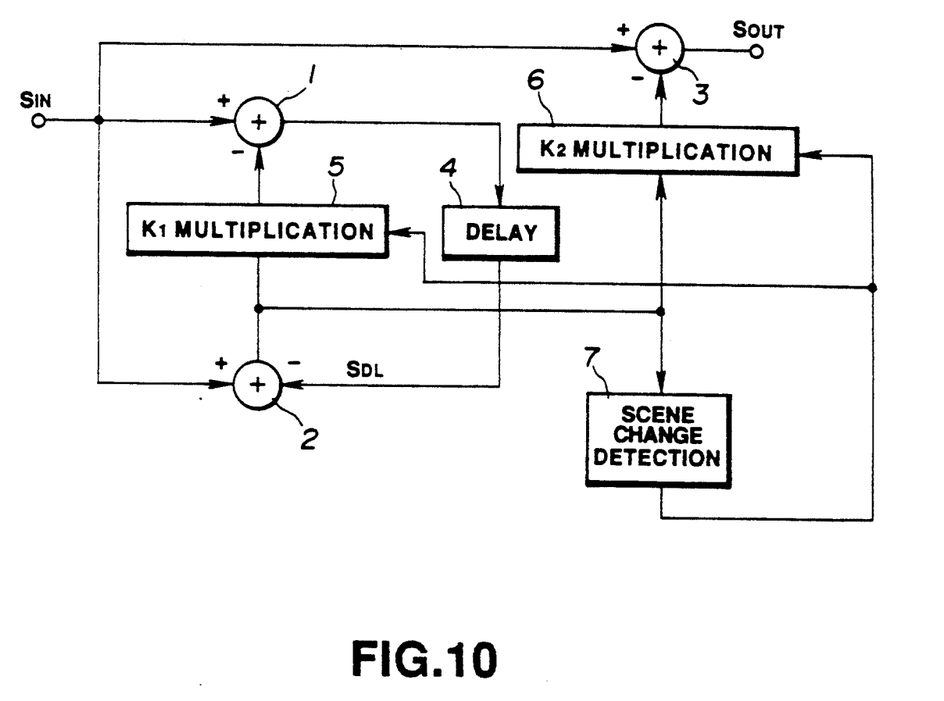
FIG. 10 is a block circuit diagram showing a second fundamental arrangement of a noise reducing device according to the present invention.

The noise reducing device according to the second fundamental arrangement shown in FIG. 10 includes a scene change detection unit 7 supplied with the sum output signal from the second additive node 2, in addition to the features according to the first fundamental arrangement shown in FIG. 1.

In the instant noise reducing device, the delay unit 4 accords a delay $z^{-1}$, corresponding to one field or to one frame, to a sum output signal from the first additive node 1. The second additive node 2 detects the difference between the input video signal $S_{IN}$ and the delayed output signal $S_{DL}$, supplied from the delay unit 4, as a noise component.

The scene change detection unit 7 detects the rate of changes in the scene of the picture represented by the input video signals based on the sum output of the second additive node 2. The scene change detection unit 7 controls the first attenuation coefficient $k_1$ of the first coefficient multiplication unit 5 and the second attenuation coefficient $k_2$ of the second coefficient multiplication unit 6 in accordance with the rate of changes in the scene to diminish the first and second coefficients $k_1$, $k_2$ for scenes presenting acute changes.

By detecting the rate of changes in the scene by the scene change detection unit 7 based on the noise component detected by the second additive node 2 for controlling the first and second attenuation coefficients $k_1$, $k_2$ of the first and second coefficient multiplication units 5, 6 to be smaller, it becomes possible to diminish the residual image and to reduce the noise component contained in the input video signal $S_{IN}$ effectively.

Referring to FIGS. 2 to 9, more concrete embodiments of the noise reducing apparatus according to the present invention are explained in detail.

Figure 2:
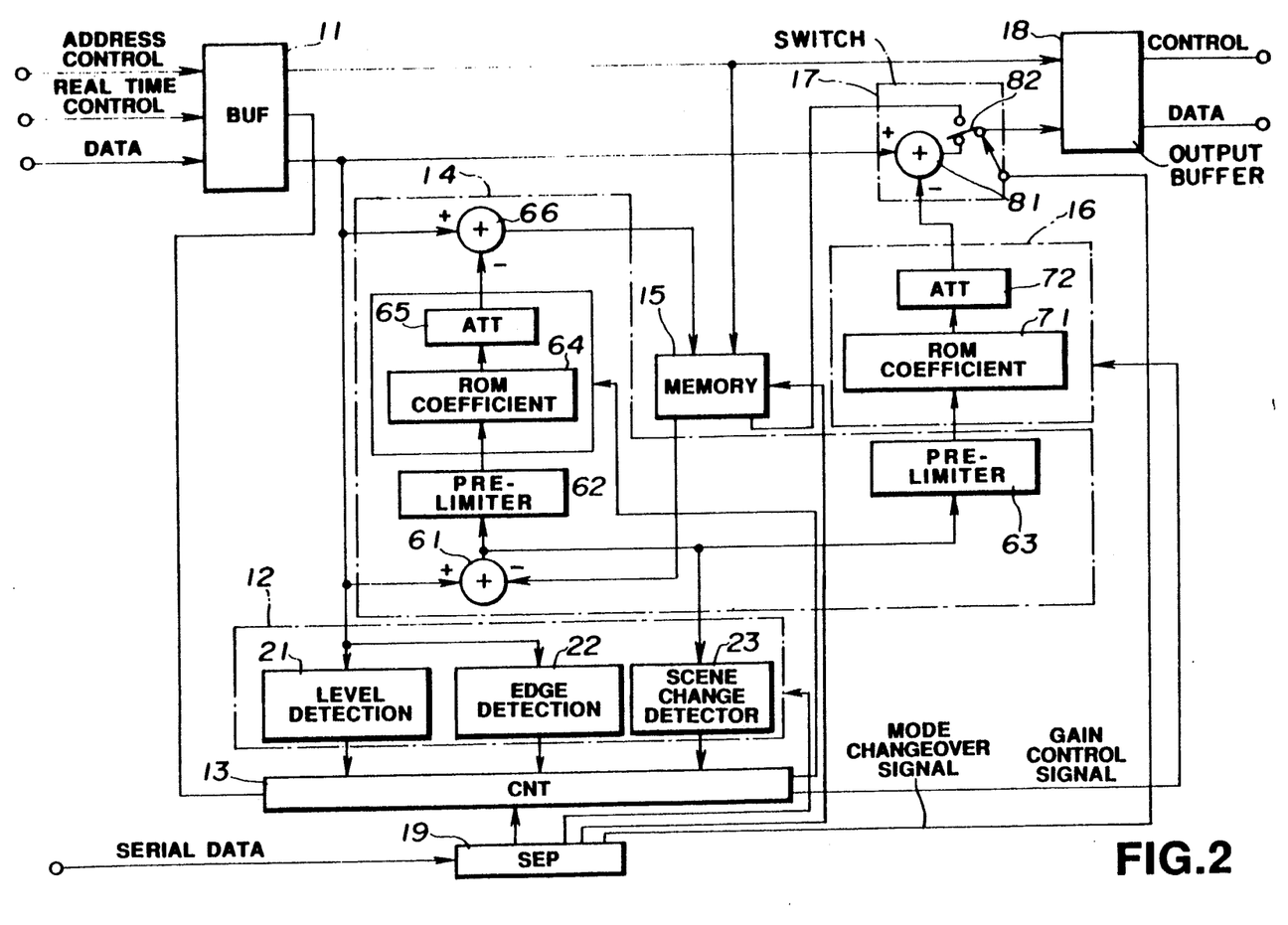
FIG. 2 is a block diagram showing a concrete arrangement of the noise reducing device according to the present invention.

The noise reducing device shown in FIG. 2 is a large-scale integrated circuit arranged in one chip and is made up of a buffer (hereinafter BUF) block 11, a detector (hereinafter DET) block 12, a controller (hereinafter "CNT") block 13, an infinite impulse response filter (hereinafter "IIR") block 14, a memory (hereinafter "MEM") block 15, a gain control (hereinafter "GAI") block 16, a switch (hereinafter "SW") block 17, an output buffer (hereinafter "OBF") block 18 and a signal separator (hereinafter SEP) block 19. The chip designed to be operated by itself as an adaptive type noise reducing unit or a 1-frame delay unit.

The BUF block 11 is a block for processing the input video signals $S_{IN}$ with conversion, such as data rate conversion, and is adapted for delaying address control signals or real-time control signals in association with delay of the video signals caused by a decimator. Output video signals from the BUF block 11 are supplied to the above-mentioned DET block 12, IIR block 14 and SW block 17. The address control signals are supplied to the DET block 12, MEM block 15 and to OBF block 18. The real-time control signals are supplied to the CNT block 13.

The DET block 12, which is a block for processing the input video signals $S_{IN}$, supplied via BUF block 11, with various detecting operations, such as level detection, edge detection or scene change detection, is made up of a level detection unit 21, an edge detection unit 22 and a scene change detection unit 23. Output detection signals of these detection units are transmitted to CNT block 13. Detect block 12 encompasses a motion detector circuit.

Figure 3:
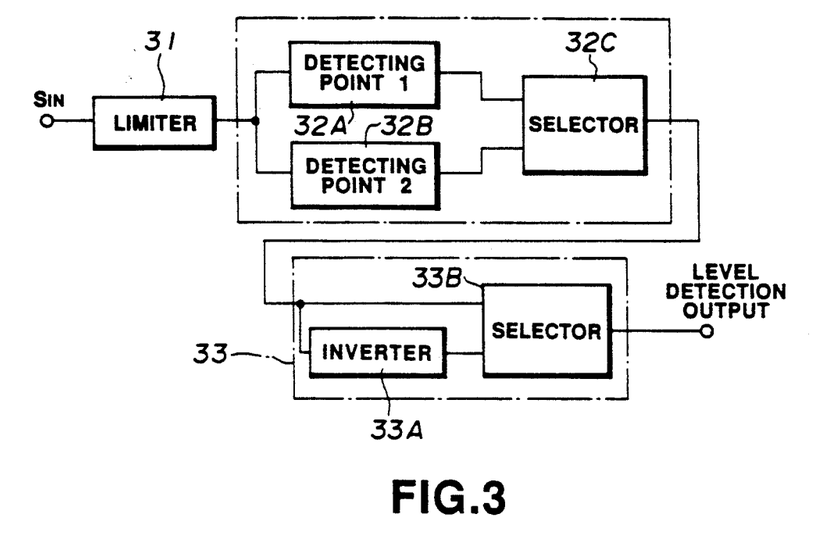
FIG. 3 is a block diagram showing an arrangement of a level detection circuit constituting a detection block of the noise reducing device shown in FIG. 2.

The level detection circuit 21 is made up of a limiting circuit 31, a detection point selector 32 and an absolute value conversion circuit 33, as shown for example in FIG. 3. The limiting circuit 31 processes the input video signal $S_{IN}$, supplied thereto via BUF block 11, with a limiting operation conforming to level detection points. If the 8-bit input signal $S_{IN}$, having its MSR as a sign bit, is represented by I(8:1), and level detection points are set at 4 bits of I(6:3), then I(6:3) of the input video signal I(8:1) is directly outputted should I8(MSB), I7 and I6 remain the same. However, should any of I8, I7 and I6 be different, then I(6:3)=0111 or I(6:3)=1000 is outputted, depending on I8(MSB), which is the sign bit. This output of the limiting circuit is supplied to detection point selector 32. The detection point selector 32 is made up of detection point circuits 32A, 32B, where the level detection points, such as I(6:3) or I(7:4), are set, and a selector 32C for selecting an output of one of them as a level detection output. The level detection output, as selected by selector 32C, is supplied to the absolute value conversion circuit 33. The absolute value conversion circuit is so constructed that the level detection output of the detection point selector is supplied to a selector 33B directly or via an inverter 33A. The selector 33B of the absolute value conversion circuit 33 performs a selecting operation in accordance with the sign bit (MSB) of the input video signal $S_{IN}$ to output an absolute value level detection signal.

Figure 4:
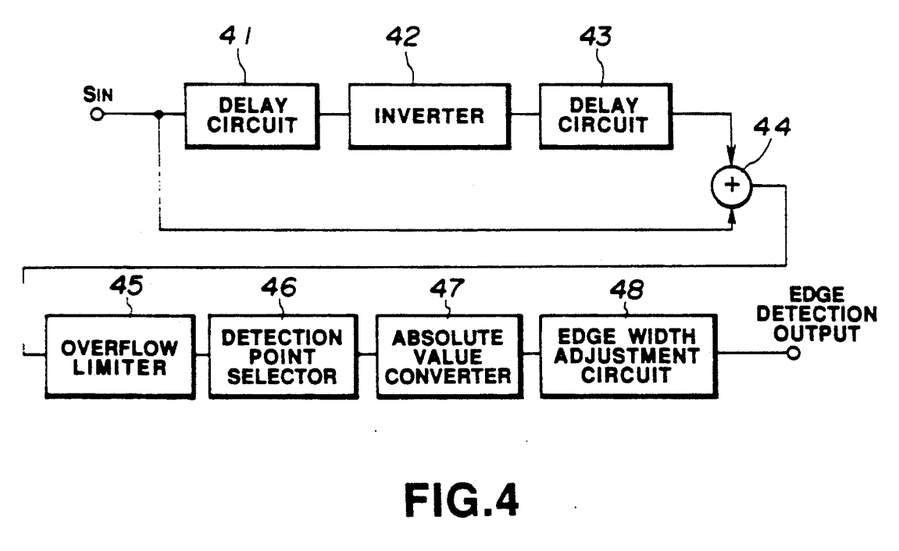
FIG. 4 is a block diagram showing an arrangement of an edge detection circuit constituting a detection block of the noise reducing device shown in FIG. 2.

For edge detection of chrominance signals, the edge detection circuit 22 is constructed as shown for example in FIG. 4. The edge detection circuit 22 delays the input video signals $S_{IN}$, supplied via BUF block 11 by two clocks by delay units 41, 43, with inversion by an inverter 42, and causes the inverted and delayed signals to be mixed with the input video signal at an additive node 44. It is noted that the input video signal is delayed by one clock, instead of by two clocks, for detecting luminance signals. Since overflow may be incurred, the edge detection circuit 22 shown in FIG. 4 is so arranged that the addition output from additive node 44, that is an edge detection output, is passed through an overflow limiter 45 and thence through a detection point selector 46, similar to that provided in the level detection circuit 21, before being converted by an absolute value converter 47 into an absolute value and outputted via an edge width adjustment circuit 48.

Figure 5:
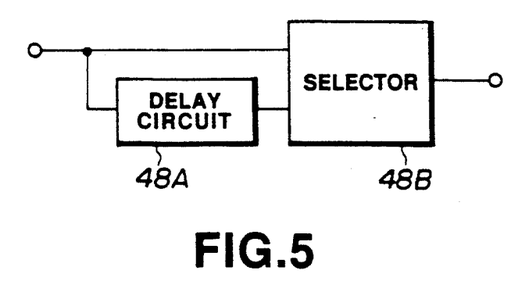
FIG. 5 is a block circuit diagram showing an arrangement of an edge width adjustment circuit constituting the edge detection circuit shown in FIG. 4.
Figure 6:
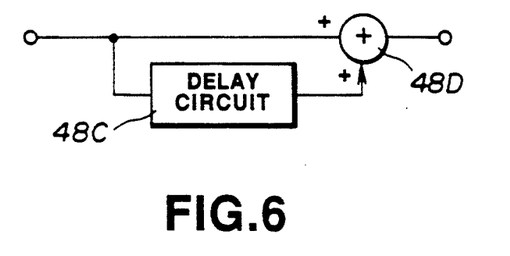
FIG. 6 is a block circuit diagram showing another arrangement of an edge width adjustment circuit constituting the edge detection circuit shown in FIG. 4.

The edge width adjustment circuit 48 compares an input signal with a signal which is the input signal delayed by two clocks by a delay circuit 48A, seen in FIG. 5, and outputs a larger one of the two signals, as selected by a selector 48B, as seen in FIG. 5, for according a width to the edge. It is noted that the input signal is delayed by one clock, instead of by two clocks, for detecting luminance signals. The edge width adjustment circuit 48 may be arranged as a low-pass filter adapted for adding the input signal to a signal, as produced by delaying the input signal by two clocks by a delay unit 48C, by an additive node 48D, and outputting the resulting sum signal, as shown in FIG. 6.

Figure 7:
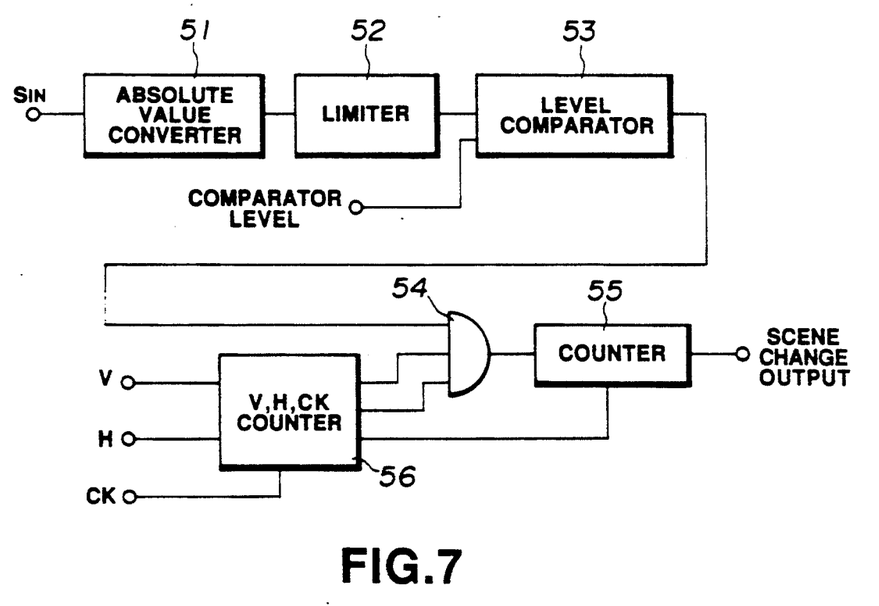
FIG. 7 is a block circuit diagram showing an arrangement of a scene change detection circuit constituting a detection block of the noise reducing apparatus shown in FIG. 2.
Figure 8:
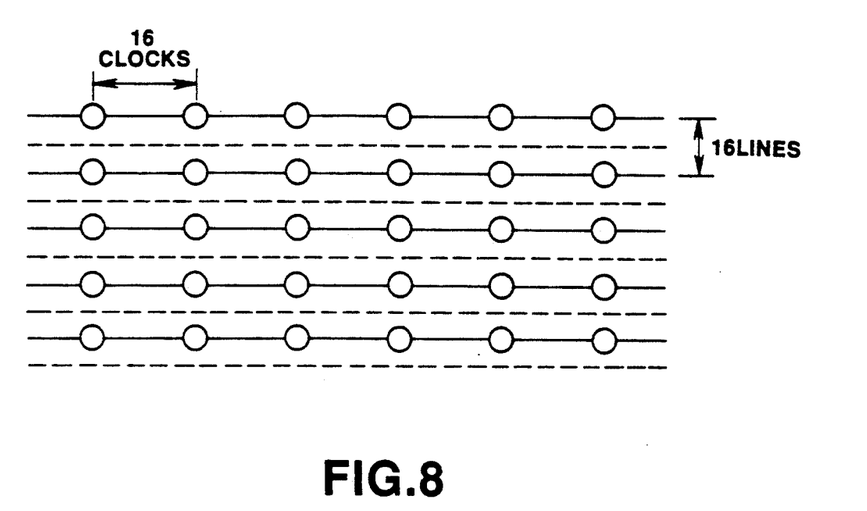
FIG. 8 is a partial front view of a screen for illustrating the operation of the scene change detection circuit shown in FIG. 7.

The scene change detection circuit 23, equivalent to the scene change detection unit 7 in the noise reducing device shown in FIG. 10, is arranged as shown for example in FIG. 7. The scene change detection circuit 23 includes an absolute value conversion circuit 51 supplied from IIR block 14 with differential data indicating the difference between the input video signal and a signal preceding the input video signal by one field or by one frame. The absolute value conversion circuit 51 converts the difference data into absolute value data which is supplied via limiting circuit 52 to a level comparator 53. The level comparator outputs a logical H signal via AND gate 54 to a counter 55 when the data of the absolute difference value difference from limiting circuit 52 is larger than a predetermined value. The scene change detection circuit 23 also includes an H, V and CK counter 56 for deciding effective data of the difference information. The H, V and CK counter 56 controls the AND gate 54 so that data at points at intervals of 16 clocks (CK) and at intervals of 16 lines (H) are accepted as effective data for each field (V), as indicated by O in FIG. 8. The counter 55 counts the number of effective data for which the output of the comparator 53 via AND circuit 54, that is the absolute difference value from the limiting circuit 52, exceeds the predetermined value. The count value of the counter 55 indicates the rate of change of the scene produced by the input video signals $S_{IN}$.

The CNT block 13 is a block for controlling the operation of the IIR block 14 and the GAI block 16. The CNT block evaluates various detection outputs of the DET block comprehensively to transmit an optimized control signal to IIR block 14 and to GAI block 16. If real-time control signals are applied to the CNT block from outside via BUF block 11, a control operation responsive to the real-time control signal is carried out preferentially.

The IIR block 14 is a block for taking the difference between the input video signal $S_{IN}$ supplied thereto via BUF block 11 and the video signal $S_{DL}$ delayed by one frame by the MEM block 15 to extract noise components. An extracted output, that is noise components, is supplied to DET block 12 and to GAI block 16.

The IIR block 14 is made up of a first additive node 61 supplied with the input video signal $S_{IN}$ from BUF block 11 and the video signal $S_{DL}$ from MEM block 15, first and second pre-limiters 62, 63 supplied with sum outputs of the first additive node 61, a coefficient ROM 64 supplied with an output of the first pre-limiter 62, and a second additive node 66 supplied with an output of coefficient ROM 64 via attenuator 65 and with the input video signal $S_{IN}$ from BUF block 11.

The first additive node 61 is equivalent to the second additive node 2 of the fundamental arrangement of the noise reducing device shown in FIG. 1, and transmits an addition output indicating the difference between the input video signals $S_{IN}$ supplied via BUF block 11 and the video signal $S_{DL}$ read out from MEM block 15 after delay by one frame to scene change detection circuit 23 of DET block 12 and to first and second pre-limiters 62, 63.

Figure 9:
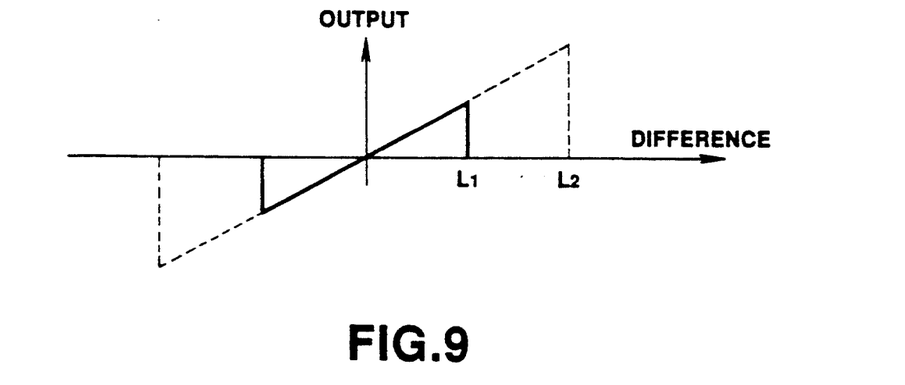
FIG. 9 is a graph showing an operation of each pre-limiter circuit constituting infinite impulse response fitter block of the noise reducing device in FIG. 2.

The first pre-limiter 62 performs a motion detection based on the assumption that a signal level of the addition output of the first additive node 61 not lower than a predetermined limiting level $L_1$ is ascribable to motion, and extracts a signal component lower than the limiter level $L_1$ as a noise component which is supplied to coefficient ROM 63, as shown by a solid line in FIG. 9. The second pre-limiter 63 performs motion detection based on an assumption that a signal level of the addition output of the first additive node 61 higher than a predetermined limiting level $L_2$ is ascribable to motion, and extracts a signal component lower than the limiter level $L_1$ as a noise component which is supplied to GAI block 16, as shown by a broken line in FIG. 9. The limiting levels $L_1$, $L_2$ of the first and second pre-limiters 62, 63 are set so that $L_1 < L_2$.

The coefficient ROM 64 converts the noise level in accordance with predetermined conversion characteristics and is so designed as to read out level data, which are stored noise level data multiplied by coefficients, using data supplied from first adder 61 via first pre-limiter 62 as read-out addresses. The noise level data thus read out from coefficient ROM 64 is supplied via attenuator 65 to the second additive node 66. The attenuator 65 accords a predetermined amount of attenuation to the noise level data read out from coefficient ROM 64 by bit shifting. The coefficient ROM 64 and the attenuator 65 are equivalent to the first coefficient multiplication unit 5 in the first fundamental arrangement of the noise reducing device shown in FIG. 1. The second additive node 66 is equivalent to the first additive node 1 in the first fundamental arrangement of the noise reducing device shown in FIG. 1 and subtracts the noise level data supplied from coefficient ROM 64 via attenuator 65 from the input video signals supplied via BUF block 11 to produce a subtraction signal which is supplied to MEM block 15. The subtraction signal is the noise-reduced video signal.

In the embodiment illustrated, three different level data with different conversion characteristics are previously recorded in coefficient ROM 64. The conversion characteristics of the coefficient ROM 64 and the amount of attenuation by attenuator 65 are controlled by an IIR control signal from the CNT block 13. In this manner, the characteristics of the IIR block 14 are finely adjusted at steps of 0.25 for assuring effective utilization of lower order bits.

The MEM block 15 is equivalent to the delay means 4 in the fundamental arrangement of the noise reducing device shown in FIG. 1. It is composed of a frame memory having a storage capacity for one frame for storing video signals supplied from the second additive node 66 of the IIR block 14 and for supplying video signals delayed by one frame to the first additive node 61 of the IIR block 14 and to the SW block 17.

The GAI block 16 is equivalent to the second coefficient multiplication unit 6 in the fundamental arrangement of the noise reducing device shown in FIG. 1, and is adapted for supplying the noise component extracted by the IIR block 14 after changing its gain. Similarly to the IIR block 14, it is made up essentially of a coefficient ROM 71 and an attenuator 72 for attenuation by bit shifting. The amount of attenuation by the attenuator 72 is variably controlled at steps of ⅛ by gain controlling signals from CNT block 13.

The TOU block 17 performs an operation of reducing the noise in the input video signal supplied thereto via BUF block 11, and is composed essentially of an additive node 81 and a changeover switch 82.

The additive node 81 of the TOU block 17 is equivalent to the second additive node 3 in the fundamental arrangement of the noise reducing device shown in FIG. 1, and is adapted for subtractively synthesizing the noise component, gain-adjusted by GAI block 16, to the input video signals supplied via BUF block 11, for generating noise-reduced video signals. During the noise-reducing mode operation, noise-reduced video signals from the additive node 81 are outputted via changeover switch 82. During the delaying mode, the video signals delayed by one frame are read out from MEM block 15 so as to be outputted via changeover switch 82.

The OBF block 18 is a block for processing the video signals supplied from SW block 17 by e.g. data rate conversion, and is adapted for delaying address control signals, real time control signals etc. in association with delaying of the video signals by the interpolation filter, for outputting the delayed signals.

The SEP block 19 converts serial data from a microcomputer, not shown, into parallel data for controlling the operation of various components.

In the above-described noise reducing device, the CNT block 13 is responsive to the various detection outputs of the DET block 12 to control the IIR block 14 and the GAI block 16 in the following manner.

That is, if the edge level indicated by the edge detection output from the edge detection circuit 22 is low, CNT block 13 decides that the picture portion is a part of a larger scene and increases the coefficient $k_1$ of the IIR block 14 and the coefficient $k_2$ of the GAI block 16 for applying a more intensive noise reduction. By employing the edge detection output in the noise-reducing operation, the noise reducing operation may be intensified in a picture portion which is a part of a larger scene where the noise is outstanding for rendering the noise less perceptible. On the other hand, since the moving parts of the still picture may be grasped by such edge detection, the noise reducing operation for the moving parts may be weakened to reduce the residual image to maintain the overall noise reducing effect.

The CNT block 13 is responsive to the signal level indicated by the level detection output by the level detection circuit 21 to control the coefficient $k_1$ of the IIR block 14 and the coefficient $k_2$ of the GAI block 16. Since the noise becomes more outstanding if the luminance signal is at a lower level, the coefficient $k_1$ of the IIR block 14 and the coefficient $k_2$ of the GAI block 16 may be enlarged in the case of a lower level luminance signal to render the noise less outstanding. On the other hand, since the noise becomes more outstanding if the chrominance signal is at a higher level, the coefficient $k_1$ of the IIR block 14 and the coefficient $k_2$ of the GAI block 16 may be lowered in the case of a higher level chromianance signal to render the noise less outstanding.

A control operation by the CNT block 13 is performed so that the lesser the rate of change in the video scene indicated by the detection output of the scene change detection circuit 23, the more is the increase in the coefficient $k_1$ of the IIR block 14 and the coefficient $k_2$ of the GAI block 16. By changing the noise reducing effect responsive to the rate of change of the video scene, it becomes possible to diminish the residual image and to increase the noise reducing effect. On the other hand, the loop coefficient $k_1$ of the IIR block 16 is minimized in case of a complete scene change to diminish the residual image.

In the noise reducing device of the present invention, output image signals are derived from the input video signals by processing the input video signals with a noise reducing operation in accordance with a transfer function H(z)

$$H(z)=\{(1-k_2)-(k_1-k_2)z^{-1}\}/(1-k_1z^{-1})$$

so that, by varying the first attenuation coefficient $k_1$ to be multiplied by the noise component detected by the second additive node, the characteristics of the processing system for detecting the noise component contained in the input video signals may be controlled adaptively and variably. Additionally, by varying the second attenuation coefficient $k_2$ to be multiplied by the noise component detected by the second additive node, the characteristics of the processing system for reducing the noise component contained in the input video signals may be controlled adaptively and variably. In this manner, the residual image may be diminished to realize effective reduction of the noise components contained in the input video signals.

Further, with the noise reducing device of the present invention, a memory having a storage capacity corresponding to a one-frame period or a one-field period is employed as delay means and a one-field difference or a one-frame difference of input video signals is detected by the second additive node. The one-field difference or the one-frame difference thus produced is multiplied with the first attenuation coefficient $k_1$ or the second attenuation coefficient $k_2$ by first and second coefficient multiplication units, respectively, where $k_1 > k_2$, by taking advantage of field correlation or the frame correlation for reducing the residual image and effectively reducing the noise components contained in the input image signals.

Still further, by detecting the motion of the picture represented by the input video signals by motion detection means and adaptively controlling the first and second attenuation coefficients $k_1$, $k_2$ of the first and second coefficient multiplication units, it becomes possible to reduce the residual image and to reduce the noise component contained in the input video signals effectively.

What is claimed is:

1. A noise reducing device for reducing the noise contained in an input video signal comprising:
   a change-over switch having a first and second input and an output;
   first addition means to which the input video signal is supplied at a first input;
   second addition means to which the input video signal is supplied at a first input;
   third addition means to which the input video signal is supplied at a first input and for producing a noise-reduced video signal at an output fed to said first input of said change-over switch;
   a memory for storing an addition output signal of said first addition means and for supplying the stored signal to a second input of said second addition means and to said second input of said change-over switch after a predetermined time period in response to a first and second control signal, respectively;
   first multiplication means for multiplying an addition output signal of said second addition means with a first attenuation coefficient $k_1$, and for supplying a first attenuated signal to the second input of said first addition means;
   second multiplication means for multiplying the addition output signal of said second addition means with a second attenuation coefficient $k_2$, and for supplying a resulting second attenuated signal to the second input of said third addition means;
   motion detecting means for detecting a motion of an image between successive scenes of said input video signal; and
   controller means for producing said first and second control signals, producing a switch control signal for controlling the state of said change-over switch, and producing coefficient control signals, in response to a detected motion of the image, for controlling at least one of said first attenuation coefficient $k_1$ and said second attenuation coefficient $k_2$.

2. The noise reducing device as claimed in claim 1 wherein said predetermined time period between storing the addition output signal of said first addition means and outputting the stored signal to said second addition means is a one-frame period or a one-field period and wherein said second addition means detects a one-frame or one-field difference of said input video signal.

3. The noise reducing device as claimed in claim 2, wherein the relation between said first attenuation coefficient $k_1$ and said second attenuation coefficient $k_2$ is defined by the formula $k_1 > k_2$.

4. The noise reducing device as claimed in claim 2, wherein said motion detecting means further comprises:

scene change detection means for detecting rates of changes in the scene of the picture represented by said input video signal based on the addition output signal of said second addition means, whereby said controller means controls at least one of said first attenuation coefficient $k_1$ and said second attenuation coefficient $k_2$ responsive to the detected rate of change of the scene of the picture.

5. The noise reducing device as claimed in claim 1, wherein said motion detecting means further comprises:

edge detection means for detecting an edge of the input video signal;

whereby said controller means controls at least one of said first attenuation coefficient $k_1$ and said second attenuation coefficient $k_2$ responsive to the detected edge.

6. The noise reducing device as claimed in claim 1, wherein said motion detecting means further comprises:

level detection means for detecting a level of the input video signal;

whereby said controller means controls at least one of said first attenuation coefficient $k_1$ and said second attenuation coefficient $k_2$ responsive to the detected level.

* * * * *